TAPE TRANSPORT

Filed March 19, 1964

4 Sheets-Sheet 1

INVENTORS
MICHAEL J. MARKAKIS &
SAMMY J. FERGUSON
BY
Robert S. Clay
ATTORNEY

INVENTORS
MICHAEL J. MARKAKIS &
SAMMY J. FERGUSON
BY
Robert S. Clay
ATTORNEY

TAPE TRANSPORT

Filed March 19, 1964 4 Sheets-Sheet 3

INVENTORS
MICHAEL J. MARKAKIS &
SAMMY J. FERGUSON
BY
Robert H. Clay
ATTORNEY

TAPE TRANSPORT

Filed March 19, 1964 4 Sheets-Sheet 4

INVENTORS
MICHAEL J. MARKAKIS &
SAMMY J. FERGUSON
BY
Robert G. Clay
ATTORNEY

United States Patent Office 3,417,938
Patented Dec. 24, 1968

3,417,938

TAPE TRANSPORT

Michael J. Markakis, Palo Alto, and Sammy J. Ferguson, San Jose, Calif., assignors to Ampex Corporation, Redwood City, Calif., a corporation of California Filed Mar. 19, 1964, Ser. No. 353,110
4 Claims. (Cl. 242—55.13)

ABSTRACT OF THE DISCLOSURE

A tape transport including a chassis, a carrier for receiving a tape cartridge therein, the carrier being pivotally mounted on the front of the chassis, a cover plate and spring means releasably connecting the cover plate and carrier whereby the cover plate and carrier can pivot as a unit for quick loading or unloading of the cartridge, or the cover plate can be readily removed to provide access to the tape deck. The transport further includes means for aligning the tape with the capstan and tape transducing heads when the carrier is pivoted towards the tape deck.

The present invention relates generally to a tape recording and reproducing apparatus or system and more particularly to a tape handler or transport particularly adapted to provide both continuous and intermittent incremental motion.

Tape handlers or transports which are associated with recording/reproducing systems and can provide intermittent incremental motion have found increasing application in research, industry and business for large scale storage of data for digital computers, and in other digital-recording applications. They are also used for recording original data.

In general such intermittent incremental motion transports require fast start-stop capabilities and the ability to transport the tape in either direction. Further, because of the volume of data handled, time is an important factor. Nevertheless, the information recorded is valuable and often irreplaceable, and the tape should not be subjected to handling that will tend to degrade the recorded information signal, as was often the case in prior art transports, merely to achieve time savings.

Space problems are also important and the prior are devices have tended to be quite large.

Also, establishing the correct pressure on the tape at the driving capstans has heretofore been a time consuming and costly operation, not only at the factory but after the initially established pressure is lost through subsequent operation of the apparatus.

Accordingly, it is a principal object of the present invention to provide a novel and improved tape recording and/or reproducing apparatus.

It is a further object to provide a novel and improved tape transport associated with a tape recording and/or reproducing apparatus or system and adapted to readily handle the recording tape.

A more specific object is to provide an improved tape transport for quickly and readily loading, positioning and unloading of a tape cartridge.

Another more specific object is to provide an improved incremental intermittent motion tape transport.

Another object of the present invention is to provide an improved tape transport in which a single operation places the recorder in condition to operate and at the same time locks the transport to prevent removal or interference with the tape.

It is a further object of the invention to provide an improved tape transport having parts simply and compactly constructed and arranged to provide a required differential in movement of different components of the transport.

Another object is to provide an improved and novel tape transport where the magnetic head is itself provided with guide means for locating the tape relative to the head.

Another object of the present invention is to provide an improved method for readily and consistently establishing a predetermined pressure between a pinch roller and its associated drive capstan in a tape transport.

Another object of the invention is to provide an improved tape transport adapted to utilize the aforesaid pressure establishing method.

A still further object of the invention is to provide a simple, compact and durable tape recording and reproducing apparatus.

Other objects and advantages of the present invention will become apparent from the following description and the drawings, wherein.

Figures 1, 8:
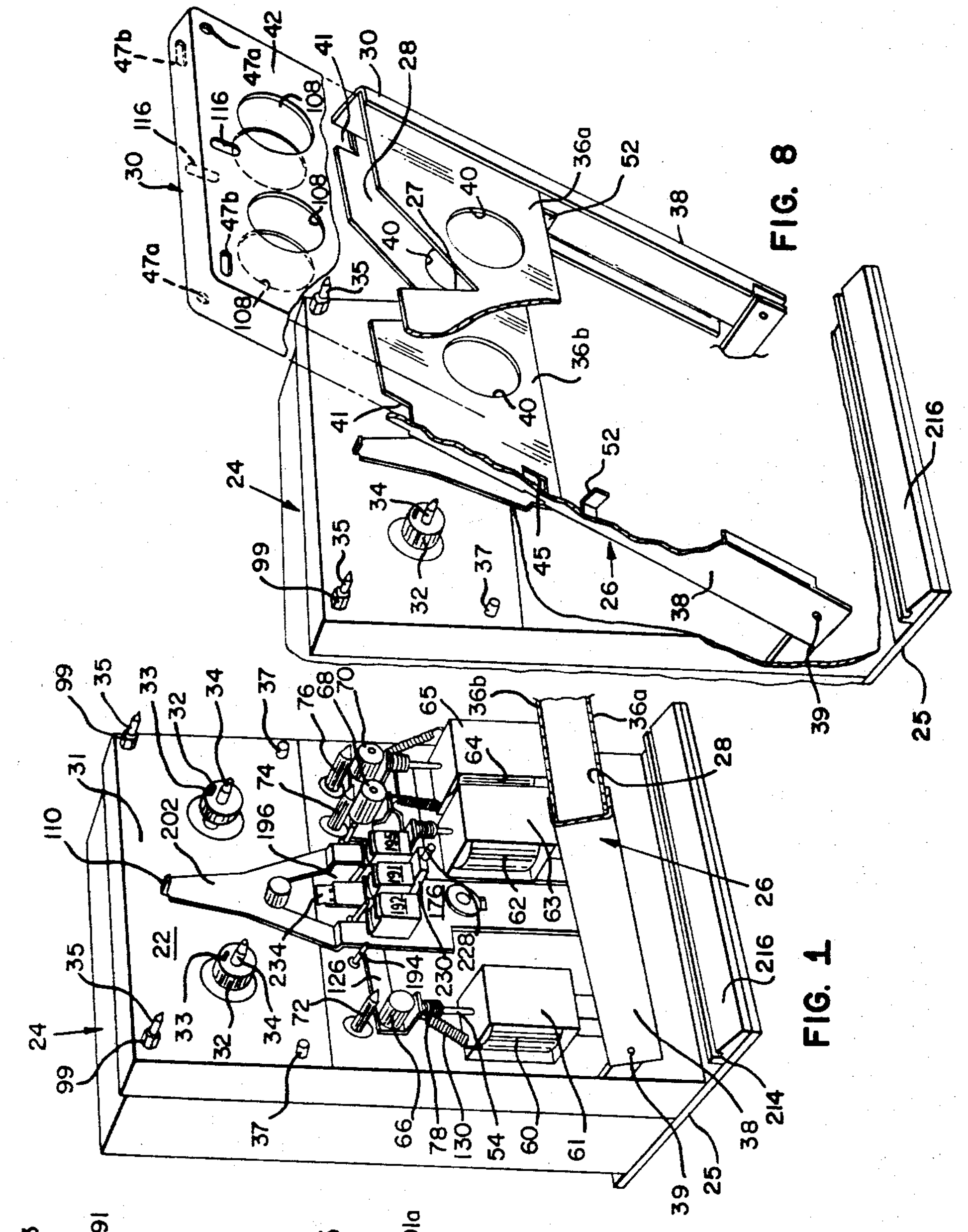
FIGURE 1 is a perspective view of a tape transport associated with a magnetic tape recording and reproducing apparatus and embodying various features of the present invention, the transport being shown with the cartridge housing in an open condition and with its cover plate removed.
FIGURE 8 is perspective view, with parts broken away, of the tape transport and the tape cartridge, the cartridge housing being shown in an open position adapted to receive the cartridge.

In brief, the illustrated tape transport or handler 22, which is associated with a magnetic tape recording and/or reproducing apparatus or system (sometimes referred to as a recorder), includes a chassis 24 and a carrier or housing 26 that has a receptacle or cavity 28 therein for receiving an associated tape cartridge 30. The housing 26 is supported on the chassis for movement between a first loading or open position where it is spaced from the chassis and disposed to receive the tape cartridge and a second operating or closed position where the housing is located adjacent to the chassis and the cartridge cannot be removed. Guide means on the chassis serve to locate the cartridge in predetermined position relative to the chassis incident to the movement of the carrier to the operating position where the cartridge is operatively connected to the transport.

The illustrated tape transport 22 also includes a key operated mechanism 29 which is selectively operable to place the recorder in condition to operate while simultaneously locking the transport so that the tape cannot be removed or changed by an unauthorized person.

Thus, the cartridge 30 is merely inserted into the receptacle 28 in the housing 26, the housing is moved from its open to its closed position and the key turned, and the recorder is ready to be operated.

Now, considering the illustrated tape transport or handler 22 in further detail, as shown best in FIGURE 1, the generally rectangular chassis includes a base plate 25 and at its forward side a vertically oriented tape deck or plate 31. The chassis supports, forwardly of the tape deck, a pair of spaced rotatable turntables 32 that each have a center spindle 34 adapted to connect to and support the cartridge reels. While other orientations of tape decks may be used, the present generally vertical orientation is preferred for the present tape transport as it facilitates ready loading of the transport as will be more fully explained below.

Figure 3:
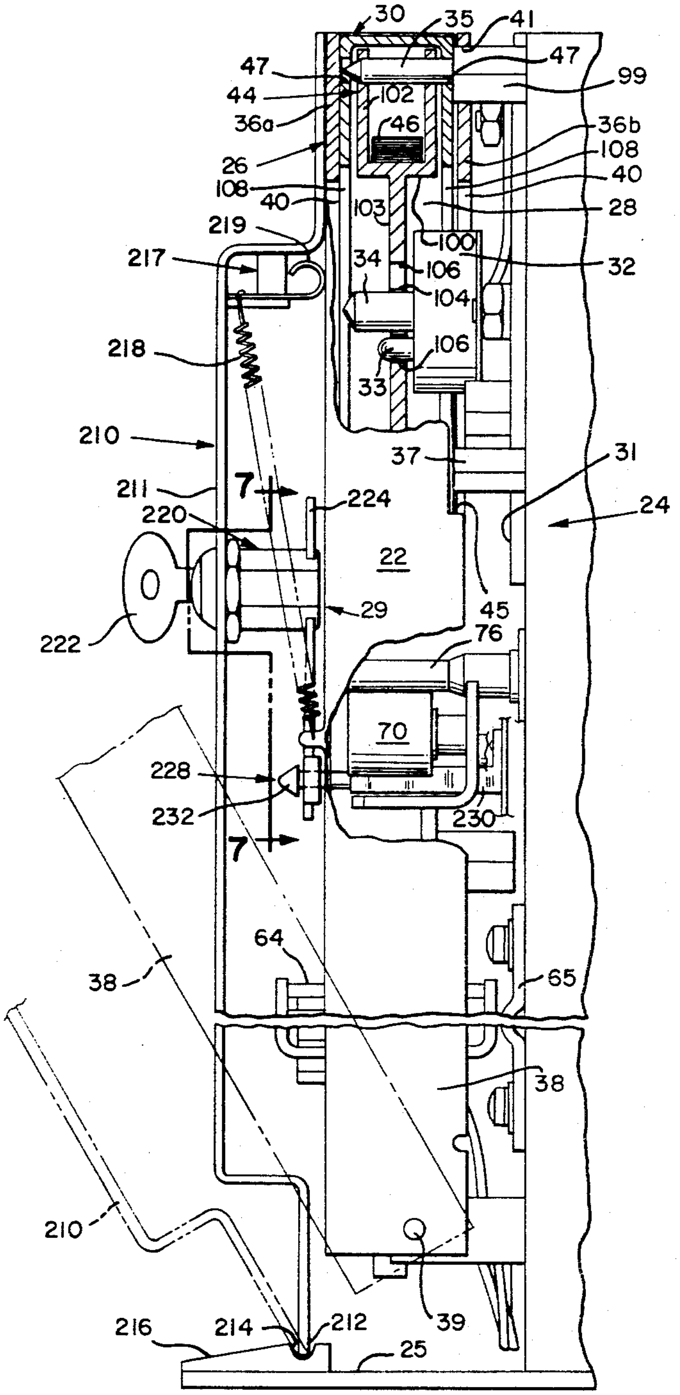
FIGURE 3 is a side sectional view, with parts broken away, of a portion of the tape transport of FIGURES 1 and 2, showing the locked and ready-to-operate condition of the transport, and also indicating in broken line an open position of the cover plate and cartridge housing.
Figure 4:
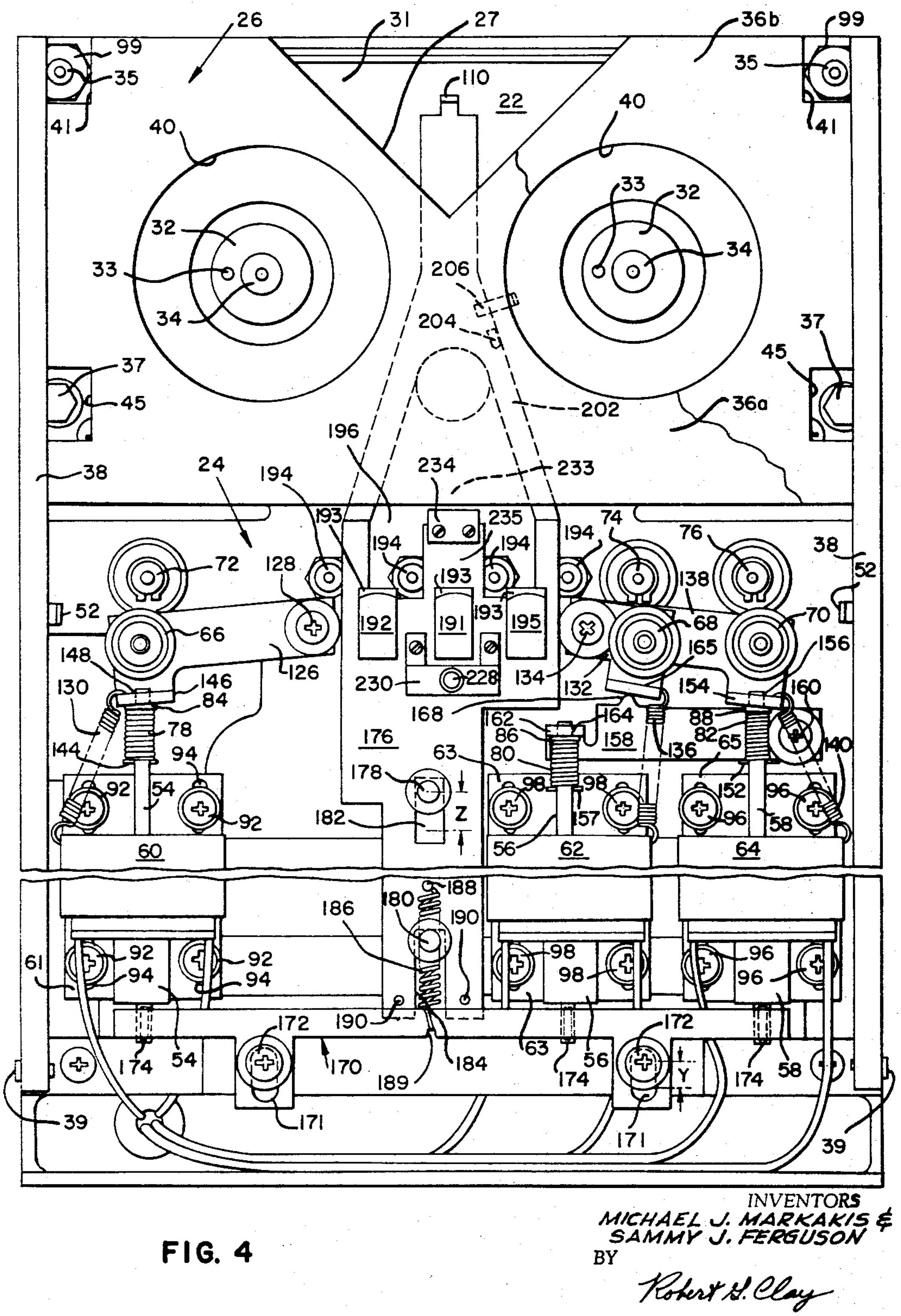
FIGURE 4 is a front view, with parts broken away, of the illustrated tape transport showing it with its front cover plate removed, without a tape cartridge, and with its components in relaxed condition.

The turntables 32, as shown in FIGURES 1, 3 and 4, are rotatable about generally horizontal, level, spaced-apart axes by suitable motor means (not shown). Each turntable 32, which is generally cylindrical in configuration, includes a connecting pin 33 which is biased to a position extending outwardly from the face of the turntable at a point closely adjacent to the associated spindle 34. The connecting pin 33 is retractable into the turntable when pressure is exerted against it.

The illustrated carrier, housing or holder 26 is of generally flat rectangular or box-type construction and includes a pair of large rectangular panels, outer panel **36*a* and inner panel 36*b*, that are interconnected along their side edges to define the generally rectangular flattened cavity or receptacle 28 for receiving the cartridge 30. The housing 26 is open along its upper edge to permit the generally flat cartridge 30 to be inserted edgewise into the cavity 28**. Means are also provided for supporting the cartridge in the housing.

More specifically, a pair of elongated channel-shaped support posts or members 38 are pivotally mounted on either side of the chassis front in generally parallel relation to one another. The posts 38 are each mounted at one end by pivot pins 39 to the lower portion of the chassis and extend generally upwardly with their channels facing inwardly toward one another to receive opposite side edges of the cartridge. When the housing is in the closed position, the posts are generally vertical. The inner panel **36*b* is connected between the rearward flanges of the posts 38 adjacent their upper ends. The outer panel 36*a* is connected between the forward flanges of the posts adjacent their upper ends. Thus, the panels are in spaced-apart parallel relation for receiving the cartridge between them. When the housing is in the closed position, the panels 36*a* and 36*b* are generally vertical and parallel to the tape deck with the inner panel 36*b* adjacent to the chassis. The cartridge, which is inserted edgewise between the panels 36*a* and 36*b* from generally above them as shown in FIGURE 8, is supported in a predetermined position between them and prevented from falling through between them by a pair of landings or projections 52 on the posts 38. Each projection 52 is secured to the rearward flange of one of the posts and extends forwardly toward the forward flange of the post at a point spaced below the panels. When the cartridge is placed in the housing it is supported at either side on one of the projections 52 (FIGURE 2) in a predetermined position where the lower portion of the cartridge is exposed for engagement by parts of the recorder as will be explained below. Each panel 36*a* and 36*b* is provided with a V-shaped notch 27** centrally of its upper edge to facilitate grasping the cartridge to remove it from the housing.

An open or loading position of the housing, where the housing is spaced from the chassis, is illustrated in FIGURES 1 and 8. The second, closed or operating position of the housing is shown in solid line in FIGURE 3.

The inner panel **36*b* of the housing is provided with suitable access apertures 40, 41 and 45 for receiving mating elements on the chassis that engage the cartridge when the housing is in its closed position. The pair of circular holes or apertures 40 are generally aligned with the turntables 32, respectively, and afford access to the spindles 34 and connecting pins 33. The rectangular corner apertures 41 at either end of the upper edge of the inner panel 36*b* are each aligned with a cylindrical positioning and locking pin 35 which is secured through an enlarged coaxial base 99 to the chassis and extends outwardly from the tape deck. Spaced below each corner aperture 41 is a rectangular side aperture 45 that is aligned with a guide member 37. The members 37** are supported on the chassis and extend outwardly from the tape deck.

Figure 2:
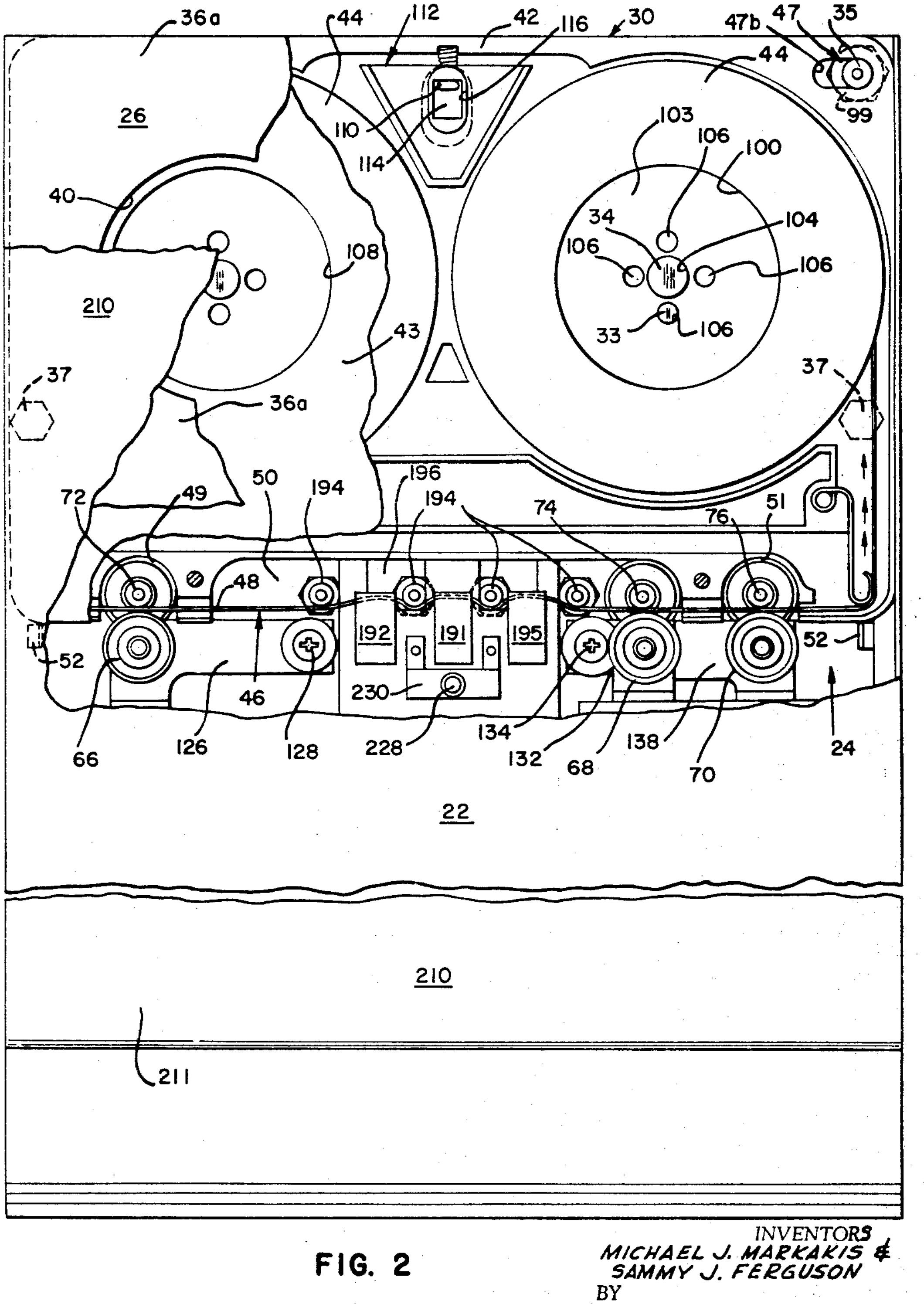
FIGURE 2 is a enlarged front view, with parts broken away to reveal details of construction, of the transport (with front cover plate) shown in FIGURE 1 and an associated tape cartridge, the cartridge being in operating position on the transport and the transport being in a driving mode of operation.

The illustrated tape cartridge 30, as shown best in FIGURES 2 and 8, includes a generally flat, rectangular, hollow casing 42, having a pair of large spaced-apart generally parallel rectangular face walls 43 interconnected by side walls. A pair of tape reels 44 are rotatably supported within the casing 42 in coplanar or generally side-by-side relation. The reels 44 are loosely positioned within a generally cylindrical cavity defined within the casing. A magnetic tape 46 has each end wound around one of the reels 44 and is directed and maintained by guide means in the casing in an extended path that includes an elongated generally horizontal section 48 adjacent to the lower edge of the casing 42. The casing 42 includes a long central recess 50 at its lower edge, which recess exposes an elongated portion of the tape in the horizontal section 48 of the path. The casing also includes a pair of smaller recesses 49 and 51 located at the left and the right respectively as viewed in FIGURE 2 of the central recess 50 and exposing shorter portions of the tape travelling in the horizontal section of the tape path.

Each of the tape reels 44 includes a generally cylindrical hub 100 and an annular flange 102 extends outwardly from either end of each hub. One end of the tap 46 is connected to the hub and the tape is wound around the hub between the flanges as shown best in FIGURE 3. Each hub 100 is also provided with a transverse wall 103 having a center hole 104 and with four connecting holes 106 that are circumferentially disposed around the center hole. The connecting holes 106 are positioned the same distance from the center hole 104 as each connecting pin 33 is positioned from the center of the associated spindle 34.

In general, the illustrated cartridge 30 is symmetrically constructed so that it may be positioned on the transport with either face wall adjacent to the chassis.

More particularly, the casing face walls 43 are provided at either side of each reel 44 with a generally circular aperture 108 which affords access to the reel. The parts are constructed and arranged so that when the cartridge is received in the housing, each of the circular access apertures 40 in the panel **36*b* adjacent the tape deck is generally aligned with one of the two apertures 108. As shown in FIGURE 8, each of the casing face walls 43 is provided with a pair of pin-receiving apertures 47: a circular aperture 47*a* at the upper right corner of the wall and a transversely elongated aperture 47*b* at the upper left corner of the wall. Then when the cartridge is placed in the housing, facing in either direction, the circular aperture 47*a* of the face wall adjacent to the chassis is on the left and the elongated aperture 47*b* is on the right. The apertures 41 on the housing panel 36*b* align with the respective apertures 47 of the inner face wall 43**.

When the cartridge 30 is positioned in the housing 26 and the latter is pivotted toward the chassis 24, the guide members 37 and pins 35 enter the apertures 41 and 45, respectively, of the inner panel **36*b*** to engage the cartridge casing and locate it and maintain it in a predetermined position relative to the chassis.

More specifically, the circular pin 35 on the left (FIGURE 8) enters the circular aperture **47*a*, and the pin 35 on the right enters the transversely elongated aperture 47*b*. Thus, the pins 35 and the two apertures 47 define the exact height of the cartridge on the chassis and support the cartridge in that position. They also prevent the removal of the cartridge from the housing while the housing is in the closed position. The circular aperture 47a locates the cartridge casing transversely of the chassis, and therefore the transverse position of the pin 35 on the right in the elongated aperture 47b is not critical. Also, the guide members 37 and the bases 99 of the pins 35 enter the panel apertures 45 and 41, respectively, and abut the rear of the cartridge to position it forwardly in the cavity 28**.

The movement of the housing toward the chassis also causes the spindles 34 to extend through the panel apertures 40 and the casing apertures 108 into the center holes 104 of the reel hubs. The connecting pins 33 similarly extend through apertures 40 and 108. If a connection pin 33 is out of alignment initially with the associated connecting holes 106, the pin 33 is depressed into the turntable 32 by the wall 103, but any subsequent relative rotation between the reel and the associated turntable will permit the connecting pin 33 to enter one of the connecting holes 106 to provide a rotational driving connection between the turntable and the reel.

The illustrated tape cartridge 30 may include a spring-biased motion-restricting or stop member 112 which is normally urged into engagement with the reels 44 to prevent their free rotation. When the cartridge is in operating position on the transport, a mating arm 110, movably mounted on the chassis as will be explained, passes through an aperture 116 in the inner face wall of the casing and is received in an aperture 114 in the stop member 112. (FIGURE 2.) The V-shaped recess 27 of the inner panel 36b of the housing affords access to the arm. The apertures 114 and 116 are so proportioned to permit the part 110 to be moved to disengage the motion-restricting member 112 from the reels to permit the free rotation of the reels.

The cartridge 30 may merely be dropped into the receptacle 28 of the housing 26 and the housing swung back against the chassis 24 to position and lock the tape into operating position. Further, the tape cartridge may be inserted with either face wall directed toward the chassis because of its reversible construction. Thus, loading the tape onto the illustrated transport 22 is made easy and the chance for error is minimized.

In general, the movement of the magnetic recording tape 46 past magnetic head or heads for recording, reproducing, scanning or erasing is provided by capstans which are driven by associated motor means (not shown). The tape is positioned between the capstans and suitable pressure rollers associated with each of the capstans when the cartridge is operatively positioned on the transport. The pressure rollers are selectively urged against the tape between it and the associated capstan to cause the tape to be driven by the capstan.

As noted generally above, the tape reels 44 are separately operated by independent motor means (not shown) that tend to rotate the reels when the tape is being driven by a capstan to wind the tape onto each: one reel takes up the tape while the other acts as a brake. This serves to maintain desired tension on the tape and prevent unreeling of the tape. The rotation of the reels may serve to provide fast forward or reverse modes for the tape recording apparatus, in which instance the capstans are out of engagement with the tape.

As shown best in FIGURES 1 and 2, tape driving capstans 72, 74 and 76 are positioned generally in a horizontal row spaced below the turntables and the capstans extend outwardly from the chassis. The capstans are rotatable about horizontal axes generally perpendicular to the tape deck by motor means such as hysteresis synchronous motors (not shown). When the tape cartridge is positioned on the transport, the capstans 72, 74 and 76 are disposed in the recesses 49, 50 and 51, respectively, of the casing 42 above various portions of the tape in the horizontal section 48 of the tape path. The capstan 72 provides reverse continuous drive (toward the left as viewed in FIGURE 2), the capstan 74 provides intermittent incremental forward drive, and the capstan 76 provides continuous forward drive.

Generally below the tape opposite the reverse driving capstan 72, a pressure or pinch roller 66 is rotatably mounted on the free end of an arm 126 which is pivotally mounted on the chassis front at a point designated 128. The roller 66 is freely rotatable about a horizontal axis which is parallel to the axis of the capstan 72. The movement of the arm 126 preferably brings the axes of the capstan and the roller into vertical alignment when the roller contacts the tape between it and the capstan. The roller is preferably provided with a contact surface of a resilient pressurizing material such as rubber. A coil spring 130 connected between the arm 126 and a part fixed to the chassis biases the roller 66 downwardly to a position spaced from the capstan 72 (FIGURES 1 and 4) where it will not interfere with the placement of the cartridge in operating position on the recorder.

A pinch roller 70 associated with the continuous forward driving capstan 76 is rotatably mounted at the free end of an arm 138 which is pivotally mounted on the chassis front at point designated 134. A coil spring 140 connected between the arm 138 and a part fixed to the chassis normally biases the roller 70 away from the capstan 76.

The incremental driving capstan 74 is associated with a pinch roller 68 which is rotatably supported at the free end of a short arm 132 which is also pivoted to the chassis front at point 134. A coil spring 136 connected between the arm 132 and a part fixed to the chassis biases the roller 68 away from the capstan 74.

In general, the pinch rollers 66, 68 and 70 are selectively lifted toward their associated capstans by solenoids 60, 62 and 64, respectively. More particularly, as shown best in FIGURES 1 and 4, the solenoid 60 is secured on the chassis below the roller 66 by a bracket 61. The bracket 61 includes means which permit the location of the solenoid to be adjusted vertically. As shown best in FIGURE 4, four screws 92 secured to the chassis front are received in vertically extending slots 94 in the bracket 61 to afford this vertical adjustment. The solenoid 60 has a vertically movabe pusher rod or pin 54 which has a coil pressure spring 78 supported about its upper end. The coil spring 78 is supported on the pusher rod 54 by a transversely extending pin 144. The arm 126 on which roller 66 is mounted has a generally horizontal extension 146 adjacent to its end and disposed generally below the roller 66. The extension 146 is provided with a hole or aperture 148 for receiving the upper end of the pusher rod 54. The pressure spring 78 is in engagement with the underside of a spacer in the form of a washer 84 that is disposed around the upper end of the pusher rod 54 and in turn engages the underside of the extension 146. When the solenoid 60 is energized, the pusher rod 54 is elevated or raised which urges the compression spring 78 upwardly against the spacer 84. This resiliently urges the arm 126 upwardly causing pinch roller 66 to press the tape against the reverse driving capstan 72, whereby the tape is driven by the rotation of the capstan 72.

In order to provide for self-aligning action of the pinch roller and to balance the moments acting thereon, the following arrangements are made. The aperture 148 into which the rod 54 is fitted is located directly beneath the midpoint of the axis of the pinch roller 66. The spring 130 is arranged to lie entirely in a vertical plane passing through the midpoint of the pinch roller 66 and the pivot point 128 of the pinch roller arm 126. Furthermore, the arm 126 is retained loosely by the pivot point 128 on a support post (not shown) extending from the chassis 24, so that the arm has a certain amount of tolerance and play in all directions. Also the arm is proportioned particularly in length so as to locate the zone of engagement between the pinch roller 66 and capstan 72 at a point that is displaced substantially, in the direction of capstan rotation, from the point of tangency on the capstan of a plane eytending from the pivot point 128 of the pinch roller arm 126. The other rollers are similarly arranged.

The solenoid 64 is adjustably supported by bracket 65 and screws 96 on the chassis front and arranged with regard to the pinch roller 70 and the continuous forward driving capstan 76 in a manner similar to solenoid 60. A pusher rod 58 of the solenoid 64 supports on its upper end a coil pressure spring 82 by means of a transverse pin 152. An extension 154 of the arm 138 has a hole or aperture 156 through which the upper end of the pusher rod 58 can extend and a washer 88 is disposed on the rod 58 between the spring 82 and the extension 154.

The solenoid 62 is arranged in a somewhat different manner with regard to the pinch roller 68 and the incremental driving capstan 74. The solenoid 62 is adjustably mounted by bracket 63 and screws 98 on the chassis front. As noted above, the drive roller 68 is rotatably mounted at the end of the short arm 132 which is pivotally secured at a common pivot point 134 with the arm 138 of the roller 70. A pusher rod 56 of the solenoid 62 is provided with a pressure spring 80 and a washer 86 disposed upon its upper end and supported by a transverse pin 157. The pressure spring 80 engages a horizontal extension 162 of an intermediate arm 158 which is pivotted at 160. The horizontal extension 162 is provided with an aperture or hole 164 through which the upper end of the pusher rod 56 may protrude. The intermediate arm 158 also includes a projection 168 that extends upwardly intermediately the ends of the intermediate arm 158 and engages a horizontal extension 165 at the end of short arm 132. Thus, actuation of the solenoid 62 raises the intermediate arm 158 which in turn raises the pinch roller 68 toward the incremental driving capstan 74.

The linkage between solenoid 62 and roller 68 is utilized because of the size of the solenoids and the deisre to provide a compact quality performance transport. In particular, spacing the capstans so that each solenoid may be positioned directly below a pressure roller would increase the overall width of the transport. Further, it would result in long sections or relatively unsupported tape between the driving capstan and the nearest tape head, particularly when the tape was being driven by the continuous forward capstan 76. The minor variations of tape movement caused by irregularities in resistance to the passage of the tape over the tape head can become a serious problem to effective recording or reproducing when the relatively unsupported tape section is long. This is particularly so when the section is sufficiently long to result in longitudinal resonant vibrations causing flutter or other problems.

When one of the solenoids is actuated, the associated pinch roller is resiliently pressed or urged toward its capstan to pinch or press the tape against the capstan. The pressure exerted by the roller against the capstan and the tape is quite important, and it is desirable that it be maintained at a predetermined value or at least within certain predetermined limits. If the pressure is too low, the tape will tend to slip causing undesirable variations in the speed of the tape relative to the tape head. The problem of slippage is particularly troublesome when the tensions exerted on the tape by the motor means of the two reels are somewhat unbalanced. On the other hand, excessive pressure against the tap can damage the tape or impair the information signal and is likewise undesirable.

The problem of establishing and maintaining the rather crucial predetermined pressure between a pinch roller and its associated capstan has in most past tape recorder apparatus created the need for repeated time consuming, expert, and thus costly adjustments. Not only is the initial factory adjustment important, but periodic subsequent adjustments are also required due to the effects of time, pressure and wear on the pinch roller and possibly also on the pressure spring. The problem is met simply yet quite effectively by the method hereinafter described in connection with the illustrated transport 22 which, among other things, illustrates one form for utilizing that method.

As noted above, the brackets 61, 63 and 65 which mount the solenoids 60, 62 and 64 respectively to the chassis permit the elevation of the solenoids to be adjusted. The tape pressure for the three illustrated driving capstans 72, 74 and 76 is provided in a similar manner so only the adjustment of the pressure on the reverse driving capstan 72 will be described in detail.

Initially with the tape in position but without the washer 84 in place, the solenoid 60 is actuated. The upper end of the pressure spring 78 presses against the horizontal extension 146. The elevation of the solenoid 60 is then adjusted so that the roller 66 is essentially in contact with the tape but exerting no pressure against the tape and capstan 72. The solenoid 60 is secured in that position, the solenoid is deactivated, and the small spacer or spacing element such as the washer 84 is positioned on the upper end of the pusher rod 54 between the upper end of the pressure spring 78 and the horizontal extension 146 of the pivot arm 126. The positioning of the washer 84 is accomplished by merely raising the arm 126, either against the force of the biasing spring 130 or after removing one of the connections of the spring 130, so that the upper end of the pusher rod 54 can be withdrawn from the aperture 148 in the extension 146 sufficiently to permit the washer 84 to be slipped over the upper end of the pusher rod 54. Then the upper end of the rod 54 is reinserted into the aperture 148 and the spring 130 re-engaged if it has been disconnected. Now when the solenoid 60 is actuated, the roller 66 is urged against the tape and driving capstan 72, which stops further upward movement of the roller. However, the pusher rod 54 continues to move an additional increment equal to the thickness of the washer 84. This in turn causes compression of the pressure spring 82 a like increment to create a predetermined pressure on the tape between the pinch roller 66 and the capstan 72. Inasmuch as the pressure is a function of the thickness of the spacer element, by varying the thickness of the spacer element a variety of different pressures may be achieved.

It should further be noted that as the pinch roller 66 wears its effective radius decreases so that the pressure created on the tape between it and the capstan 72 decreases. To correct this condition or other undesired changes in capstan pressure it is not necessary to add additional spacers, but the method outlined above may essentially merely be repeated. That is, the washer 84 is removed, the solenoid 60 is actuated and its position elevated to place the roller 66 in non-pressure contact with the tape between it and the capstan 72. The washer 84 is then reinserted to again create the predetermined pressure on the tape between the roller 66 and the capstan 72.

The solenoids 64 and 62 are similarly elevationally adjustable and may be readily provided with predetermined pinch roller pressures by use, as described above, of spacers in the form of the washers 88 and 86, respectively.

As seen in FIGURE 4, a transversely extending generally horizontal bar or part 170 is mounted on the chassis 24 below the solenoids for vertical movement. Specifically, the bar 170 is provided with a pair of spaced-apart vertical slots 171 which receive mating pins 172 that extend outwardly from the chassis front. The bar 170 is provided with vertically adjustable screws 174 which are each aligned with the lower end of one of the solenoid pusher rods. The bar 170 is biased downwardly by springs 130, 136 and 140, which act through their respective pressure springs and pusher rods, toward a lower position (FIGURE 4) and is movable to an upper position when the recorder is placed in condition for operation. When the bar 170 is moved to the upper position, the solenoid pusher rods are lifted to elevated positions and the pinch rollers are thereby moved to positions closely adjacent to the capstans but with sufficient gap or space left for the tape to move freely between the capstans and rollers. This gap may be in the order of .010 inch for a tape having a thickness in the order of .001 inch.

The pinch rollers 66, 68 and 70 are thus located closely adjacent to the respective driving capstans 72, 74 and 76 when the recorder is placed in condition for operation, which aids to minimize the reaction time of the recording apparatus.

As shown in FIGURES 1 and 4 an elongated generally flat shiftable part, member or plate 176 is supported in a vertically extending position to the chassis front. The plate 176 is positioned generally centrally of and parallel to the chassis front. The shiftable plate 176 is mounted for vertical sliding or shifting movement on a pair of vertically aligned and spaced pins 178 and 180 which extend outwardly from the chassis front generally centrally thereof and are received respectively in vertical slots 182 and 184 in the shiftable plate 176. FIGURE 4 shows the plate 176 in its lower or relaxed position, while FIGURES 2 and 3 show portions of it in its raised position.

As shown in FIGURE 4, the plate 176 is connected by a lost motion connection or means to the vertically movable transverse part or bar 170. More specifically, a coil tension spring 186 is secured at its upper end to a pin 188 secured to the shiftable plate 176 above the lower slot 184. The spring 186 is connected at its other or lower end in a slit 189 provided in the transverse bar 170 to create a resilient connection between the shiftable plate 176 and the bar 170. A pair of pins 190 secured to the outer face of the shiftable plate 176 limit the relative vertical movement of the plate 176 and the bar 170 toward one another under the urging of the spring 186.

Figure 5:
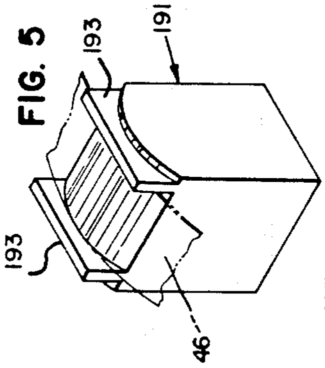
FIGURE 5 is persepctive view of a magnetic head for the illustrated tape transport.

In the illustrated transport 22, a magnetic record/play head 191, an erase head 192, and a reverse erase head are secured to the outer face of the shiftable plate 176 in a position so that when the plate is raised the heads 191, 192 and 195 will be positioned as shown in FIGURE 2 to engage the tape. As shown particularly in FIGURE 5, which shows record/play head 191 in detail, each of the heads 191, 192 and 195 is provided with a pair of spaced-apart elongted ribs or tape guides 193 positioned on the head. Each rib 193 of the pair on a head extends across the head adjacent one side of the tape path across the head. The guides 193 are adapted to engage the longitudinal edges of the tape to guide the tape to the proper position relative to the head when the head is raised to engage the tape and further to guide the tape incident to its travel past the head.

Figure 6:
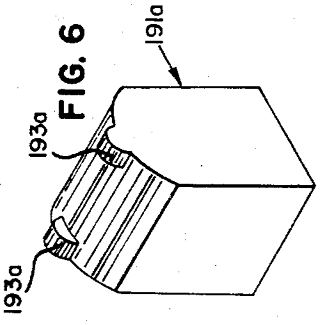
FIGURE 6 is perspective view of modified form of a magnetic head.

A modified form of magnetic head **191*a* having a pair of spaced-apart button-like tape guides 193*a*** is shown in FIGURE 6.

As shown best in FIGURES 2 and 4, a generally horizontal row of four spaced-apart tape guide pins 194 extend outwardly from the chassis front, with the center two extending respectively through mating portions of a cutout section 196 of the shiftable plate 176. The guide pins 194 are disposed, when the cartridge is in position on the transport, in the center recess 50 of the cartridge casing 42 above the tape in the horizontal section of the tape path. The guide pins 194 are located intermediate the heads 191, 192 and 195 and positioned to form or wrap the tape around the magnetic heads as the tape moves past the heads.

The upper portion of the shiftable plate 176 includes an inverted Y or yoke-shaped section 202 which includes the extending arm or part 110 which operates to release the stop member 112 of the cartridge. The arm 110 extends out of the plane of the shiftable plate 176 away from the chassis and is positioned to enter the aperture 114 of the stop member 112 when the cartridge is positioned adjacent to the chassis.

As shown in FIGURE 4, an activating extension 204 extends rearwardly from the yoke section 202 and is positioned so that it engages and actuates a switch 206, that is secured to and extends outwardly from the tape deck 31, when the plate 176 is shifted to its raised position. The switch 206 is in series with a control circuit of the recorder so that it must be activated to put the recorder in condition to be operated.

The shiftable plate 176 is also provided with a cartridge housing latch 234. The latch 234, which is an upwardly extending plate, is secured to the upper end of a central extension 235 of the plate 176, which extension projects up into the cutout portion 196 of the plate. When the housing is in its closed position and the shiftable plate 176 is in its lower position, the latch 234 is disposed below and somewhat forwardly of a centered latching portion 233 of lower edge of the inner panel **36*b*. When the shiftable plate is lifted, this causes the latch 234 to be positioned immediately outwardly of that latching portion 233** to thereby lock the housing in its closed position relative to the chassis.

The illustrated structure provides a desired lift differential in a simple yet effective manner. The movement of the bar 170 is limited to a relatively small increment, indicated by the letter Y in FIGURE 4, which is determined by the dimensions of the slots 171 and the pins 172. The connection of the bar 170 to the shiftable plate 176 through the spring 186 permits the latter plate 176 to have a larger increment of upward movement as indicated by the letter Z in FIGURE 4. This larger increment of movement is desirable to ensure that the guides 193 of the magnetic heads are lowered a sufficient distance from their tape-engaging position to prevent interference or damage to the tape when the cartridge is moved into operating position. The relatively smaller increment of movement of the bar 170 is necessary to provide compact structure yet effective pressure mechanism for the driving capstans. More particularly, it is desirable that the pinch rollers be freely mounted on the ends of the pivot arms to reduce problems of skewing or misalignment. Further, it is desirable that the arms on which the pinch rollers are mounted be relatively short, both to conserve space to provide a compact structure and to assure better positioning and support for the pinch rollers. When relatively short pinch roller arms are used, however, it is preferred that the increment of movement of the arms and pinch rollers also be relatively short because of the arc described by a point at the end of the short arm as the arm is pivoted, i.e., the large amount of transverse or across-transport movement for a given increment of lift. Such deviation from a vertical path is undesirable because of the directions at which forces are applied to the pinch roller and arm, because of the transverse deviation or deformation of the upper end of the spring necessary in following the arc, and because of the necessity of enlarging the aperture in the horizontal extension of the pinch roller arm for receiving the upper end of the pusher rod to allow for its transverse movement incident to a large lift.

As shown best in FIGURE 3, the illustrated tape transport 22 is provided with a front cover plate 210 which is a generally rectangular plate disposed vertically immediately outwardly of the cartridge housing 26. The plate 210 is formed with a transversely extending center band 211 that is spaced outwardly relative to the upper and lower portions of the cover plate. The lower edge 212 of the cover plate is received in an upwardly open horizontal transverse groove 214 in a transversely extending block 216 secured to the forward edge of the base plate 25 of the chassis.

The cover plate 210 is connected in relation to the cartridge housing by a pair of coil tension springs 218, each at one side of the cover plate. Each of the springs 218 is releasably secured at one upper end to the inside wall of the center band 211 as by means of a connector bracket 217 that includes a releasable pin 219. Each spring 218 extends inwardly and downwardly to connect at its lower end to one of the support posts 38 for the cartridge housing. The springs 218 thus serve to urge the cover plate in a downward and inward direction, seating the lower edge 212 of the cover plate in the groove 214 and urging the cover plate toward the cartridge housing and the chassis.

In general, the cover plate 210 tends to move with the cartridge housing 26 as the latter is pivoted between its closed position as indicated in solid line in FIGURE 3 and an open position such as partially indicated in broken line in that figure. Thus, the cover plate has corresponding open and closed positions relative to the chassis. The cover plate not only pivots about its lower edge as the cartridge housing is moved, but the springs 218 maintain it urged toward the housing while it slides vertically relative to the housing.

The front cover plate 210 may be readily removed from its position to provide access to the tape deck by merely disconnecting the springs 218 at the bracket connectors 218 and, while the cover plate is positioned as necessary to clear all parts of the transport, lifting the cover plate out of the groove 214. The foregoing cover plate construction permits ready assembly and disassembly of the cover plate and avoids problems of alignment. There is only one pair of interconnecting operational parts between the cover plate and the remainder of the tape transport as will be seen from the following description.

Figure 7:
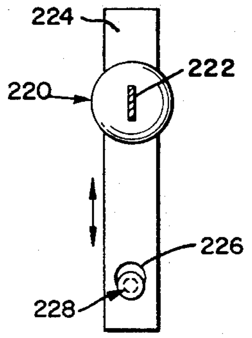
FIGURE 7 is sectional view taken generally along line 7—7 of FIGURE 3.

The illustrated tape transport 22 includes suitable means or mechanism for raising the shiftable plate 176 and this means operates in the illustrated structure to also lock the cartridge housing 26 and the cover plate 210 in their respective closed positions. More particularly, as shown best in FIGURES 3 and 7, a key-operated mechanical mechanism 220, which is secured generally centrally of the transverse band 211 of the cover plate 210, includes an externally opening keyway adapted to removably receive a key 222. The mechanism 220 includes an elongated vertically disposed and movable bar 224 which includes an aperture 226 at its lower end. The bar 224 is disposed inwardly of the cover plate. When the cover plate 210 is moved to the closed position, an arm 228 mounted by the bracket 230 (FIGURES 1, 3 and 4) to the shiftable plate 176 is received through the aperture 226. Turning the key 222 to the locked position serves to lift the bar 224 by means of a cam mechanism (not shown), which in turn lifts the arm 228. The plate 176 is thereby raised the large increment Z equal to the lift of the bar 224, while the transverse bar 170 is raised the smaller increment Y as described above.

The arm 228 is provided with an enlarged head 232 which, as shown in FIGURE 3, overlaps the lower edge of the aperture 224 when the bar 224 is raised. The arm 228 serves to lock the cover plate 210 in its closed position relative to the chassis by preventing it from pivoting or raising out of the groove 214. As noted above, the upward movement of the plate 176 also positions the latch 234 so as to lock the cartridge housing in closed position.

Thus, the single key operated mechanism which locks the cover plate and housing in position and thus prevents removal or tampering with the tape on the recorder, also functions to simultaneously place the recorder in condition for operation. Operation: Initially the cartridge housing or carrier 26 and the front cover plate 210 are moved to open positions such as shown in broken line in FIGURE 3 and in FIGURES 1 and 8. Then the cartridge 30 is oriented generally as shown in the FIGURE 8 and placed or dropped down into the housing cavity or receptacle 28 where it is supported in predetermined position by the projections 52. The housing and the cover plate are then pivoted toward the chassis to the closed generally vertical position as shown in solid line in FIGURE 3. FIGURE 4 illustrates the closed position of the cartridge housing (without the cartridge disposed within it), as well as the respective positions of the other components of the tape transport 22 at this stage of the loading. As noted above, the tape in the horizontal section 48 of the tape path is disposed in the space between the respective tape driving capstans 72, 74 and 76 and lowered pinch rollers 66, 68 and 70 and between the pin guides 194 and the lowered magnetic heads 191, 192 and 195. As the cartridge housing is moved in against the chassis, the positioning and locking pins 35 on the chassis enter the apertures 47 at the corners of the cartridge and the guide members 37 and bases 99 of the pins 35 abut the cartridge to locate, support, and lock the cartridge in predetermined position relative to the chassis so long as the cartridge housing 26 is in its closed position. Also incident to the movement of the housing toward the chassis, the turntable spindles 34 enter the center holes 104 of the respective reels 44 and the turntable connecting pins 33 each enter or are positioned to enter one of the holes 106 of a reel. Thus, the reels 44 are each rotatably supported in a predetermined position relative to the chassis.

Then the key 222 is turned to both place the recorder in condition for operation and to lock the front cover plate and housing in position (FIGURE 3). More specifically, the shiftable plate 176 is raised to lift the reel stop member 112 of the cartridge, to position the latch 234 to lock in place the cartridge housing, to bring the magnetic heads 191, 192 and 195 into engagement with the tape, and to cause the extension 204 to close the recorder switch 206. Further, the upward movement of the plate 176 lifts the transverse bar 170 to raise the pinch rollers 66, 68 and 70 to their non-engaging ready positions where they are in close proximity to but spaced from the capstans. As noted above, the shiftable part 176 and the components it carries are raised the larger increment Z while the transverse bar 170 is raised the smaller increment Y.

FIGURE 2 illustrates the position of the components of the transport in operating condition with the tape being driven to the right by the incremental drive capstan 74. The components as seen in FIGURE 2 are in approximately the same positions as ready-to-operate condition, except that the solenoid 64 has been activated to urge the roller 68 against the tape and incremental driving capstan 74 with the predetermined pressure which results in the tape being moved to the right incident to the intermittent incremental rotation of the capstan 74. At the same time the desired head is activated to record or reproduce. The other rollers 66 and 70 remain in their non-engaging closely spaced ready positions.

For other modes of operation one of the other solenoids is energized and the appropriate magnetic head is energized, while the remaining solenoids and heads are de-energized. For fast movement of the tape, either forward or reverse, all the pinch rollers are lowered to their closely spaced non-engaging ready positions and the motion is provided by the motor means of the turntables.

The key 222 may be removed to prevent unauthorized operators from removing or changing the cartridge.

To remove the cartridge, the key is turned to the unlocked position permitting the components which were previously raised to be lowered. Then the cartridge housing and cover plate are swung away from the chassis to an open position. The mating V-recesses 27 in the upper edges of the cartridge housing panels permit the operator to readily grasp the cartridge and remove it from the housing.

Thus, the illustrated tape transport 22 permits simple, ready and fast loading of the tape. The transport may be locked to prevent removal or tampering with the tape on the machine and this may be achieved by a single simple operation which at the same time places the recorder in condition for operation. The illustrated transport is simple, compact and durable while providing effective performance. Further, the illustrated transport is adapted for use of a novel method for readily establishing the amount of pressure between a capstan and its associated pinch roller.

Various changes and modifications may be made in the described structure without departing from the spirit and scope of the present invention.

Various features of the present invention are set forth in the following claims.

We claim:

1. A tape transport construction associated with a tape recorder/reproducer and comprising:

a chassis including a forwardly extending base section having an elongated transverse groove, a carrier pivotally mounted on the front of said chassis for supporting a tape, a cover plate positioned at the front of said chassis with its lower edge removably received in said groove, and tension spring means releasably connected between a first point on said cover plate and a relatively lower second point on said carrier, whereby said cover plate and carrier can pivot as a unit while said spring means permits relative sliding movement between them or said cover plate can be readily removed from said transport.

2. A tape transport construction associated with a tape recorder/reproducer and comprising:

a chassis including a forwardly extending base section having an elongated transverse groove, a carrier pivotally mounted on the front of said chassis for movement toward and away from said chassis about a horizontal transverse axis adjacent the lower edge of said chassis for supporting a tape, a cover plate positioned at the front of said chassis and extending generally vertically with its lower edge removably received in said groove, and a pair of tension springs releasably connected between a first level of said cover plate and a relatively lower second level of said carrier, one of said springs being disposed at either side of said transport construction, to permit said cover plate and carrier to pivot as a unit while permitting relative sliding movement therebetween.

3. A tape transport construction as recited in claim 2, wherein:

there is also provided a tape cartridge and a tape mounted therein on a pair of reels, said tape being exposed in part between said reels;

said carrier is provided with means for receiving said cartridge at the upper side of said carrier when said carrier is pivoted away from said chassis, and for guiding said cartridge in sliding motion downwardly into said carrier to a loading position in which said cartridge is entirely within said carrier;

said chassis is provided with tape transducing heads, a plurality of capstan and pinch roller assemblies for selective operation to drive said tape in a plurality of various modes and a pair of reel driving spindles mounted in a position of alignment with said exposed tape and said reels when said carrier is pivoted toward said chassis with said cartridge in said loading position;

said position of alignment being one in which said capstans, pinch rollers and heads confront but are spaced substantially from said exposed tape, and said spindles are inserted in said reels for driving said reels;

means are provided for bringing said assemblies, said heads and said exposed tape into a position of readiness in which said heads are engaged with said tape and said capstan and pinch roller assemblies are also engaged with said tape but with insufficient pressure to drive said tape;

said cover plate being provided with locking means engaging said chassis for locking said cover plate, said carrier and said cartridge to said chassis, said locking means also engaging and operating said means for bringing said capstan-pinch-roller assemblies and said heads to said position of readiness; and means are provided for selectively actuating said capstan and pinch roller assemblies for driving said tape in said various modes.

4. A tape transport construction as recited in claim 3, wherein:

said locking means includes a key-operated lock on said cover plate for locking said transport in closed condition while said transport is in operating mode.

References Cited

UNITED STATES PATENTS

| | | | |
|---|---|---|---|
| 2,969,929 | 1/1961 | Rudzitis | 242—55.13 |
| 3,146,316 | 8/1964 | Knoth | 242—55.13 X |
| 3,167,267 | 1/1965 | Crane | 242—55.13 |
| 3,273,815 | 9/1966 | Schuller | 242—55.12 |

GEORGE F. MAUTZ, *Primary Examiner.*

U.S. Cl. X.R.

274—11; 179—100.2; 226—188